US008682975B2

(12) United States Patent
Vilis

(10) Patent No.: US 8,682,975 B2
(45) Date of Patent: Mar. 25, 2014

(54) SYSTEM AND METHOD FOR IDENTITY MANAGED COLLABORATION

(75) Inventor: Raymond A. Vilis, Ottawa (CA)

(73) Assignee: Solacom Technologies Inc, Quebec (CA)

( * ) Notice: Subject to any disclaimer, the term of this patent is extended or adjusted under 35 U.S.C. 154(b) by 425 days.

(21) Appl. No.: 12/040,015

(22) Filed: Feb. 29, 2008

(65) Prior Publication Data

US 2008/0215682 A1 Sep. 4, 2008

Related U.S. Application Data

(60) Provisional application No. 60/892,547, filed on Mar. 2, 2007.

(51) Int. Cl.
*G06F 15/16* (2006.01)
*H04M 3/42* (2006.01)

(52) U.S. Cl.
USPC ............ 709/205; 709/204; 709/206; 379/202

(58) Field of Classification Search
USPC ......................................................... 709/205
See application file for complete search history.

(56) References Cited

U.S. PATENT DOCUMENTS

| 7,512,984 B2* | 3/2009 | Lee et al. ......................... 726/26 |
| 2004/0068567 A1* | 4/2004 | Moran et al. .................. 709/227 |
| 2004/0174392 A1* | 9/2004 | Bjoernsen et al. ............ 345/751 |
| 2004/0221037 A1* | 11/2004 | Costa-Requena et al. .... 709/225 |
| 2006/0235851 A1* | 10/2006 | Akachi ............................. 707/9 |
| 2007/0285504 A1* | 12/2007 | Hesse ........................ 348/14.08 |
| 2007/0299914 A1* | 12/2007 | Jones et al. .................... 709/205 |
| 2008/0005244 A1* | 1/2008 | Vernon et al. ................. 709/204 |
| 2008/0069011 A1* | 3/2008 | Sekaran et al. ............... 370/260 |
| 2008/0086564 A1* | 4/2008 | Putman et al. ................ 709/227 |
| 2009/0019367 A1* | 1/2009 | Cavagnari et al. ............ 715/716 |
| 2009/0067425 A1* | 3/2009 | Komiya et al. .............. 370/390 |

* cited by examiner

*Primary Examiner* — Shaq Taha
(74) *Attorney, Agent, or Firm* — Gowling, Lafleur & Henderson LLP

(57) ABSTRACT

A system and method for identity managed collaboration (IMC) that in various embodiments can provide for: identity management of participants within a collaboration session to set entitlement; identity security for participants to allow participants to determine what identity is projected; participation in a collaboration session in a monitoring mode via a browser without the need to install client software on an access appliance; audio collaboration via a plurality of communication media; and Leave Existing & Add Preferred (LEAP) capability to allow participants to dynamically changes access appliances.

18 Claims, 2 Drawing Sheets

SYSTEM AND METHOD FOR IDENTITY MANAGED COLLABORATION

CROSS-REFERENCE TO RELATED APPLICATIONS

This application claims priority from U.S. Provisional Patent Application Ser. No. 60/892,547, filed Mar. 2, 2007, the entirety of which is incorporated herein by reference.

FIELD OF INVENTION

The present invention relates to the field of computer-assisted collaboration, in particular, to a system and method for identity managed collaboration providing audio, video and data collaboration and where access to a collaboration session can be via communication technologies including the public switched telephone network (PSTN), mobile (a.k.a. cellular) networks, Internet Protocol (IP) networks and radio networks

BACKGROUND

Computer-supported co-operative work (CSCW) is a field of study that addresses how collaborative activities and their coordination can be supported by means of computer systems. The embodiments of CSCW provide for people working in groups using the enabling technologies of computer networking, associated hardware, software, services, and techniques that are often referred to as groupware, computer-assisted collaboration or media-assisted collaboration.

A collaboration session typically involves multiple participants who access the session via any of a plurality of well-know communication medium such as, for example, terrestrial telephony (e.g. Public Switched Telephony Network (PSTN)), mobile (a.k.a. cellular) telephony (e.g. Global System for Mobile Communications (GSM)), broadband connection (e.g. Internet Protocol (IP)), and other radio-based connections (e.g. Wi-Fi (a.k.a. IEEE 802.11)). Some collaboration systems support the use of different communication media by each of the participants.

Each participant uses a computing-platform based device (i.e. access appliance) such as, for example, a personal computer, a personal digital assistant (PDA), a mobile phone, an Internet browser running on any of the these devices, and other similar communication devices. Many currently available collaboration systems either support a limited selection devices or require that a collaboration system client application (e.g. Internet browser plug-ins) be loaded and executed on the device in order to participate in a session. Due to various security, performance and convenience considerations, many participants would prefer to be able to use a platform of their choice without the need to load a collaboration system specific client application.

The collaboration session is hosted by a computing-platform based system often referred to as a collaboration server. The collaboration server can be either a monolithic system or a distributed system including components shared with other systems. The capabilities of the collaboration server determines what types of media can be included in the collaboration session. Media types can, for example, include audio, video and data. Data media can include files, web pages, bit-streams and other similar data representations in a variety of well know encoding formats. The capabilities supported in the collaboration session can be further determined by parameters managed by an administrator of the collaboration system.

Each collaboration session typically has a designated organizer who arranges for the session to be established and who may specify parameters for the session.

Typically, each participant in the collaboration session is authenticated before joining the session. When a participant joins, or leaves, the session the event is made known to other participants. The arrival and departure of a participant is announced using an identity assigned to the participant. Authentication and the identities of participants are typically managed by an administrator of the collaboration server, the organizer of the collaboration session, or a combination of the two. In some collaboration contexts it is desirable that the participant be able to control the identity use to identify him/her and to announce his/her arrival and departure (e.g. when the participant wishes to remain anonymous or wishes to monitor the collaboration session without the other participants being aware of his/her participation). This capability is not provided by currently available collaboration systems.

Typically collaboration systems are designed to permit each participant to join a collaboration session using any one platform via any one communications medium. With a growing diversity of platforms available and with the every growing pervasiveness of a multitude of communication media, participants want to be able to switch platforms and/or communication media while continuing to participate in a collaboration session. The ability to switch platforms and/or communication media would enable a degree of flexibility and mobility not afforded to participants by currently available collaboration systems.

Available collaboration systems that demonstration some of the shortcomings described above include WebEX™ (www.webex.com), GoToMeeting® (www.gotomeeting.com), and MicroSoft Office SharePoint Serve.

What is needed is a system and method for collaboration that permits participants to control their identity in a collaboration session, permits participants to change the access appliance used to access a collaboration session during the course of the session.

SUMMARY OF INVENTION

A system and method for identity managed collaboration (IMC) that in various embodiments can provide for: identity management of participants within a collaboration session to set entitlement; identity security for participants to allow participants to determine what identity is projected; participation in a collaboration session in a monitoring mode via a browser without the need to install client software on an access appliance; audio collaboration via a plurality of communication media; and Leave Existing & Add Preferred (LEAP) capability to allow participants to dynamically changes access appliances.

In accordance with one aspect of the present invention, there is provided a system for identity managed collaboration, for providing a collaboration session to which each of a plurality of participants can be connected from one of plurality of access appliances via one of a plurality of communication media, the system comprising: an identity and session manager for storing, managing, enforcing and applying: collaboration session rules, a plurality of participant entitlements, and a plurality of participant identity security records, the identity and session manager further for, responsive to a notification, announcing the arrival and departure of each participant using an identity specified in the corresponding participant identity record and responsive to the corresponding participant entitlements; a collaboration medium module for supporting a plurality of collaboration media for use in the collaboration session; an access rules module for the storage and management of access rules that specify which one of a plurality of access modes will be assigned to each participant responsive to the communication media used by the participant to connect to the collaboration session; an access control module for assigning an access mode to each participant responsive to the communication media used by the participant to connect to the collaboration session and to the corresponding participant entitlement, and for re-assigning an access mode when any of the participants switches from one of the plurality of access appliances to another of the access appliances for connecting with the collaboration session; a connection control module; and a session trigger module for initiating the collaboration session.

The collaboration session rules specify which of the plurality of communication media can be used to connect to the collaboration session, specify which of the plurality of participants can connect to the collaboration session and identify which of the participants are to be contacted to connect to the collaboration session. The plurality of participant entitlements, each one corresponding to one of a plurality of participants, each participant entitlement specifying which access modes the participant can use, what indicator is to be used to announce the participants arrival in and departure from the collaboration session, and the participants privilege to change access appliances while connected to the collaboration session. The plurality of participant identity security records, each one corresponding to one of the plurality of participants, each participant entitlement specifying an identity to used to identify the participant to other participants in the collaboration session.

The connection control module provides functionality including: managing connections between the system and the participants; allowing and disallowing connections to the system responsive to collaboration session rules and the participant entitlement corresponding to each participant; for initiating connections with participants responsive to the collaboration session rules when the collaboration session is initiated; accepting connections from participants responsive to the collaboration session rules and the corresponding participant entitlements; notifying the identity and session manager of the establishment and termination of a connection to each participant; and providing audio collaboration continuity when any of the participants switches from one of the plurality of access appliances to another of the access appliances for connecting with the collaboration session;

In accordance with another aspect of the present invention, there is provided a method for identity managed collaboration, for providing a collaboration session to which each of a plurality of participants can be connected from one of plurality of access appliances via one of a plurality of communication media, the method comprising the steps of: creating collaboration session rules that specify which of the plurality of communication media can be used to connect to the collaboration session, specify which of the plurality of participants can connect to the collaboration session and identify which of the participants are to be contacted to connect to the collaboration session; creating a plurality of participant entitlements, each one corresponding to one of a plurality of participants, each participant entitlement specifying which access modes the participant can use, what indicator is to be used to announce the participants arrival in and departure from the collaboration session, and the participants privilege to change access appliances while connected to the collaboration session; creating a plurality of participant identity security records, each one corresponding to one of the plurality of participants, each participant entitlement specifying an identity to used to identify the participant to other participants in the collaboration session; creating access rules that specify which one of a plurality of access modes will be assigned to each participant responsive to the communication media used by the participant to connect to the collaboration session; initiating a collaboration session, responsive to a trigger, initiating connection with participants responsive to the collaboration session rules, and accepting connections from participants responsive to the collaboration session rules and the corresponding participant entitlements; assigning an access mode to each participant responsive to the communication media used by the participant to connect to the collaboration session and to the corresponding participant entitlement; announcing the arrival of each participant using an identity specified in the corresponding participant identity record and responsive to the corresponding participant entitlements; providing audio collaboration continuity and re-assigning an access mode when any of the participants switches from one of the plurality of access appliances to another of the access appliances for connecting with the collaboration session; and announcing the departure of each participant using an identity specified in the corresponding participant identity record and responsive to the corresponding participant entitlements when the participant leaves the collaboration session.

In accordance with another aspect of the present invention, there is provided a computer program product for identity managed collaboration, for providing a collaboration session to which each of a plurality of participants can be connected from one of plurality of access appliances via one of a plurality of communication media, the computer program product comprising: computer executable instructions, stored on a computer readable storage medium, for: creating collaboration session rules that specify which of the plurality of communication media can be used to connect to the collaboration session, specify which of the plurality of participants can connect to the collaboration session and identify which of the participants are to be contacted to connect to the collaboration session; creating a plurality of participant entitlements, each one corresponding to one of a plurality of participants, each participant entitlement specifying which access modes the participant can use, what indicator is to be used to announce the participants arrival in and departure from the collaboration session, and the participants privilege to change access appliances while connected to the collaboration session; creating a plurality of participant identity security records, each one corresponding to one of the plurality of participants, each participant entitlement specifying an identity to used to identify the participant to other participants in the collaboration session; creating access rules that specify which one of a plurality of access modes will be assigned to each participant responsive to the communication media used by the participant to connect to the collaboration session; initiating a collaboration session, responsive to a trigger, initiating connection with participants responsive to the collaboration session rules, and accepting connections from participants responsive to the collaboration session rules and the corresponding participant entitlements; assigning an access mode to each participant responsive to the communication media used by the participant to connect to the collaboration session and to the corresponding participant entitlement; announcing the arrival of each participant using an identity specified in the corresponding participant identity record and responsive to the corresponding participant entitlements; providing audio collaboration continuity and re-assigning an access mode when any of the participants switches from one of the plurality of access appliances to another of the access appliances for connecting with the collaboration session; and announcing the departure of each participant using an identity specified in the corresponding participant identity record and responsive to the corresponding participant entitlements when the participant leaves the collaboration session.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

A system and method for identity managed collaboration (IMC) to establish and manage collaboration sessions (CS), having one or more collaboration media such as, for example, audio, video, shared workspaces, and instant messaging (IM). The audio collaboration medium can be accessed via any a variety of communication media such as, for example, time division multiplexing (TDM), Internet Protocol (IP), mobile (including push-to talk), and radio (e.g. Falcon, Single Channel Ground and Airborne Radio System (SINCGAR)). The other collaboration media can be accessed via a broadband communication media, or alternatively via an IP or other data protocol supported on any of the communication media used for the audio collaboration.

Figure 1:
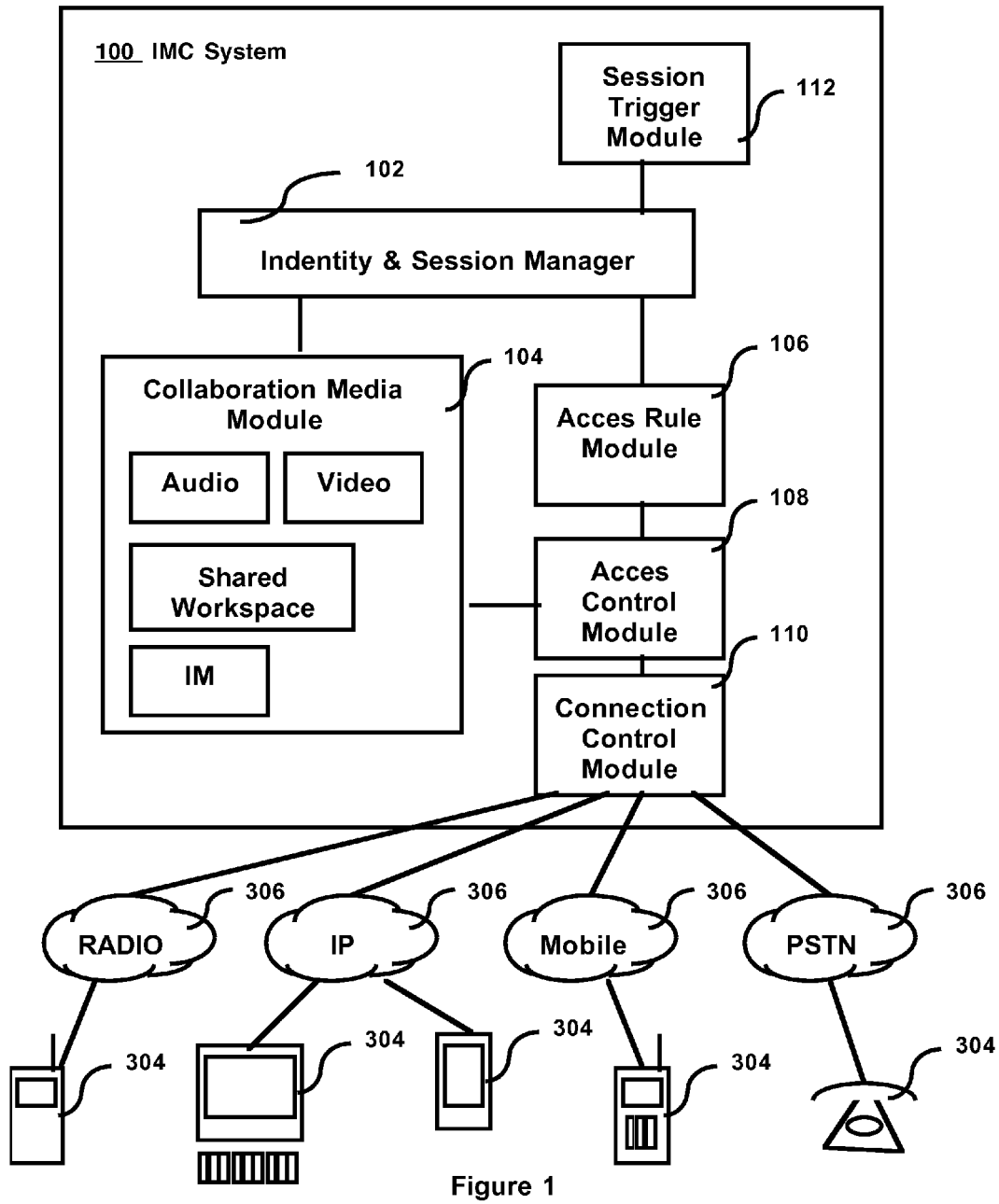
FIG. 1 is a schematic representation of an exemplary embodiment of an identity managed collaboration system.

FIG. 1 is a schematic representation of an exemplary embodiment of an identity managed collaboration system 100 in an exemplary collaboration session environment. The system 100 comprises: an identity and session manager (ISM) 102, a collaboration medium module 104; an access rules module 106; an access control module 108, a connection control module 110, and a session trigger module 112. Participants of a collaboration session can use a variety of access appliances 304 (e.g. landline telephone, mobile telephone, personal computer, PDA) to connect to the system 100 via a plurality of connection media 306.

The system 100 controls each of one or more CS based on pre-defined sets of each of the following:

Collaboration session rules. The rules can include, for example, which participants can join the CS, which collaboration media can be used in the CS, which participants are to be contacted to join the CS (including when they are to be contacted), and which participants will connect on their own.

Individual participant entitlements. Each participant entitlement can, for example, include:
 Which collaboration media the participant is permitted to access in the CS;
 Participant CS arrival/departure indicators as seen/heard by other active participants (e.g. whether an indication is given or the participant remains unannounced);
 Leave Existing & Add Preferred (LEAP) privileges (i.e. the ability to change access appliance while maintaining contact with an established CS);
 Security level. The security levels can be any of a plurality of distinguishable levels (preferably ordered). The security level assigned to a participant can be used to restrict access to some CS content when the participant's level is insufficient. The security level can be displayed to other participants in the CS, this being particularly advantageous when a participant's identity is anonymous;
 Communication media. Specifies which communication media 306 the participant is permitted to use; and
 Which access appliances 304 (e.g. landline telephone, mobile telephone, soft-phone, PDA, personal computer) can be utilized by the participant.

Participant Identity Security records.
 The system 100 can mask the true identity of the participant and in its place project a managed identity defined by the participant for a specific access method, time, or session.
 Managed identities can include any of:
  a directory number (DN) associated with a telephony access appliance;
  an participant name;
  an identity tag (a.k.a. alias); and
  an IP address associated with an IP access appliance.

Access rules determine what access mode will be assigned to an participant by the system 100, based on the communications medium used by the participant. The participant's access mode is adjusted dynamically when the communication medium being used changes. Access modes can include:
 Interactive Mode: In this access mode the participant has access to shared workspaces and IM with the ability to enter information to the workspaces and alternatively full audio or video conferencing, as allowed by the specific CS;
 Audio only Mode: In this access mode the participant has access to the full audio conference portion of CS;
 Monitor Mode: In this access mode the participant is provided all audio, video, IM and shared workspace information but cannot enter information into those elements of the CS; and
 Audio Monitor Mode: In this access mode the participant is provided Monitor Mode capabilities as described above with the exception that the audio is a full two-way connection, allowing the participant to participate in the audio conference component of the CS.

Based on the aforementioned controls, the system 100 can manage the following for one or more collaboration sessions:
 Shared workspaces such as dynamic whiteboard spaces;
 Interactive file sharing;
 Video sources either for providing video conferencing between participants or the shared viewing of a video feed;
 Instant Messaging text areas; and
 Audio conferencing.

Referring again to FIG. 1, the ISM 102 stores one or more collaboration session rules, a plurality of participant entitlements, and a plurality of participant identity security records. The IMS 102 supports the management (e.g. the creation, modification and deletion) of the collaboration session rules, the participant entitlements and the participant identity security records through an operational control interface (OCI) (not illustrated). The collaboration session rules can be managed by a CS organizer. The participant entitlements can be managed by an administrator of the system 100. The participant identity security records can be managed by the individual participants. The ISM 102 further provides for the enforcement and application of the collaboration session rules, the participant entitlements and the participant identity security records in each of one or more CS. The collaboration medium module 104 provides support for a plurality of collaboration media that can be used in each CS such as, for example, audio, dynamically shared workspaces, video and IM. The access rules module 106 provides for the storage and management of a plurality of access rules. The access control module 108 provides for the application and enforcement of the access rules stored in the access rules module 106 by determining what access mode, as described above, will be assigned to each participant in a CS responsive to the communication medium 306 used by the participant. The access control module 108 can dynamically change the access mode assigned to a participant during the course of a CS when the participant changes the access appliance 304 being used. The connection control module 110 manages the connections for both inbound and outbound calls (i.e. access application 304 initiated and system 100 initiated) to and from the system 100 and administers an admission control function for the inbound connections. Connections to the connection control module 110 can be made from a plurality of different access appliances 304 using any a of a plurality of communication media 206 such as, for example, terrestrial telephony, mobile telephony, broadband and radio networks. The admission control function allows or disallows connections in accordance with the collaboration session rules and the participant entitlements. The connection control module 110 also provides notification to the ISM 102 of the establishment and termination of connections by participants. Responsive to the notifications, the ISM 102 can announce the arrival and departure of a participant in the CS using the identity in accordance with the participant identity security records. The connection control module 110 can provide for continuity of the audio collaboration medium to a participant when the participant switches from a first access appliance already connected to the CS to a second access appliance to be connected to the CS in accordance with the participants LEAP privileges. The participant connects to the system 100 using the second access appliance while still connected using the first access appliance. The connection control module 110 in conjunction with the collaboration medium module 104 and the ISM 102 provides an audio connection between the second access appliance and the CS. The participant can then disconnect the first access appliance without losing audio continuity with the CS, and subsequently any other media support in accordance with a determined access mode can be established for the second access appliance in the usual way as described above.

The session trigger module 112 can initiate a CS at a particular time and date provided by the CS organizer. The organizer can specify which participants are to be contacted to join the CS (see collaboration session rules described above). The connection control module 110 can initiate connections to the specified participants responsive to a indication received from the session trigger module 112.

The system 100 enables participants to access the CS via any well-know type of access appliance 304 having an Internet browser without the requirement for downloading a client application to the access appliance 304. The participant can access any of the CS collaboration media (e.g. audio, video, shared workspace, and IM) via the browser. The system 100 further enables participants to access the CS in Audio only Mode via any well-know access appliance 304 having only audio capability such as, for example, a landline or mobile telephone.

Figure 2:
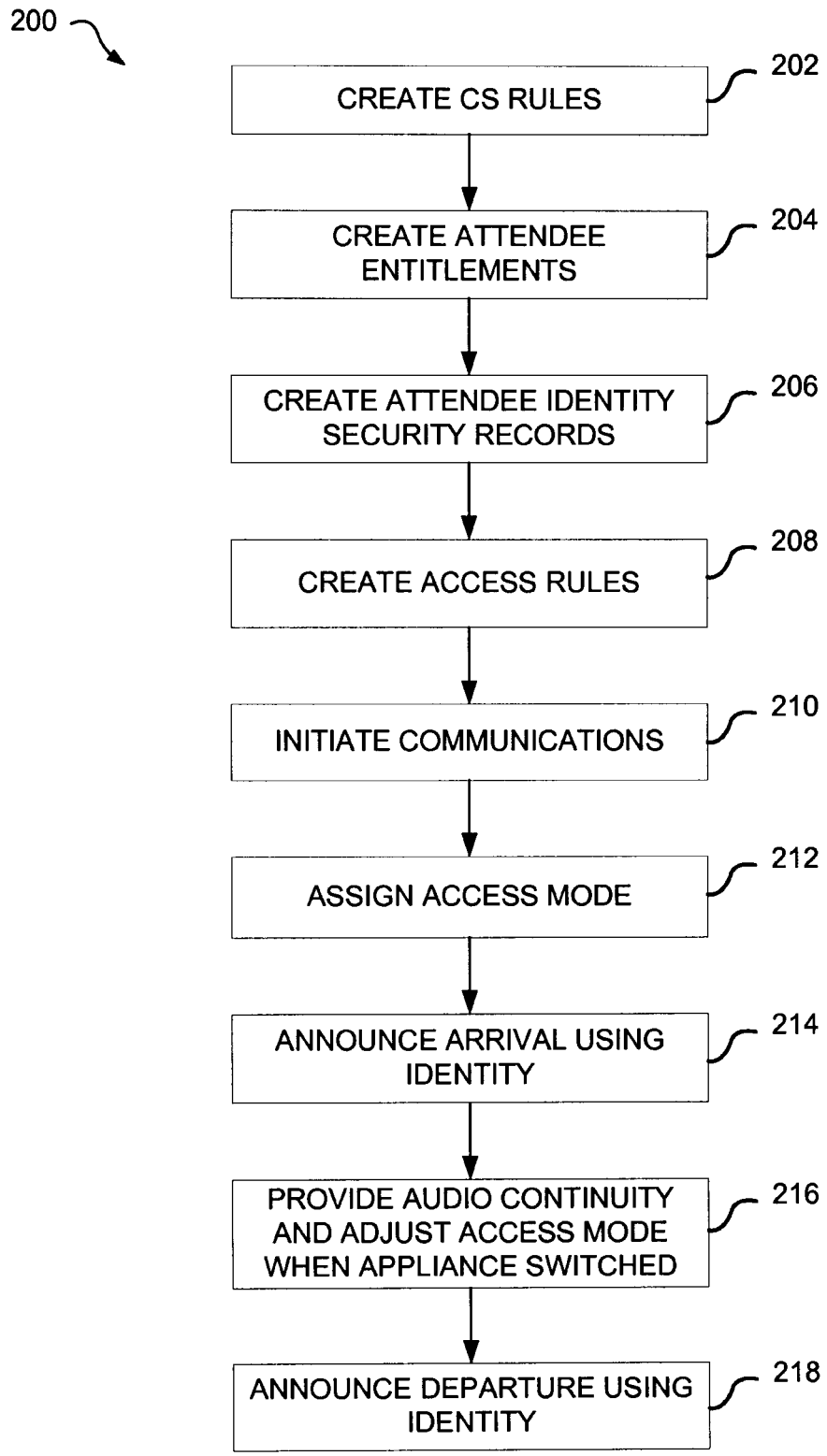
FIG. 2 is flow diagram representing the steps in a method for identity managed collaboration.

FIG. 2 is flow diagram representing the steps in a method 200 for identity managed collaboration. The method 200 can be implemented using system 100 as described above with reference to FIG. 1. In step 202 collaboration session rules, as described above, are created or alternatively existing collaboration session rules are modified by the CS organizer. In step 204 participant entitlements, as described above, are created or alternatively existing entitlements are modified by the CS organizer. In step 206, participant identity security records, as described above, are created or alternatively existing participant identity security records are modified by the corresponding participant. In step 208, access rules, as described above, are created or alternatively existing access rules are modified by the administrator. In step 210, responsive to a CS trigger, a CS is initiated, communications with identified participants is initiated, and connections are accepted from other participants in accordance with the collaboration session rules and the individual participant entitlements. In step 212, an access mode is assignment to each participant that joins the CS responsive to the communication media used by the participant and in accordance with the access rules and to the participant entitlement corresponding to the participant. In step 214, the arrival of each participant is announced to the other participants in the CS using the identity specified in the participant identity security record corresponding to the participant. Alternatively, in accordance with the participant's entitlement, no announcement is made. In step 216, audio collaboration continuity is provided and the access mode is adjusted (i.e. modified) responsive to a participant switching from one access appliance used to connect to the CS to another access appliance. In step 218, the departure of each participant is announced to other participants in the CS using the identity specified in the participant identity security record corresponding to the participant.

The system 100 and method 200 for IMC provide for:
Identity management of participants within a collaboration session to set entitlements;
Identity security for participants to allow participants to determine what identity is projected;
Monitoring capability via any browser without the need to install software clients on an access appliance;
Audio collaboration including IP, cellular, PSTN and radio end points;
LEAP function to allow participants to dynamically shift (i.e. change between) access appliances; and
Inclusion of small-screen mobile devices as full participants in the collaboration session, without the use of downloaded 'clients'.

According to the present invention, the system 100 and method 200 for IMC can be implemented using a computer program product comprising computer executable program instructions stored on a computer-readable storage medium.

Numerous modifications and departures from the specific embodiments described herein may be made without departing from the spirit and scope of the present invention.

The following session examples are provided to illustrate the capabilities of the system 100 and method 200 for IMC.

Example Session—Border Security:
An alarm triggers a collaboration session to a designated response team. The IMC system contacts all team members and enters them into the session.
Team members who are not on allowed access appliances or operating from qualified IP addresses, are challenged and their identity verified prior to being allowed access to the session.
The team shares available information via audio, video, and shared workspaces. The IMC system projects a video image from an area of interest onto a shared workspace, where team members identify specific points of interest. The indicated points are shared among all members of the team.

One of the team members (the mobile member) is sent to investigate the alarm and using the LEAP function transfers the session from his/her PC to his/her WiMax PDA. The IMC system automatically connects the audio component and, via the PDA's standard browser, provides the team member access to the shared workspace and video components of the session.

The mobile team member stays in the session as he/she investigates the alarm. Automatic audio/video/data recordings that were created during the session and other event data are archived.

Once the situation is resolved the session can be terminated or maintained for an immediate action follow-up or debriefing session.

Example Session—Corporate Training:

A new manufacturing tool is being introduced into a company with distributed production facilities.

Corporate Training establishes a collaboration session between designated personnel and the new product team. The IMC system contacts all session members and enters them into the session.

Session members are challenged and their identity verified prior to being allowed access to the session.

The product team shares available information via audio, video, and shared workspaces. The IMC system projects a video image from an area of interest onto a shared workspace, where the interactive training of members is conducted. Points of interest can be brought out and shared with all team members.

Site-specific issues can be resolved on-line in a corporate session or dealt with in separate sessions at each individual site.

Automatic audio/video/data recordings that were created during the session and other event data are archived and can be replayed by the members as a training refresher.

Example Session—Contract Management:

A company has a prime contract with a variety of distributed sub-contactors.

Program review sessions between the sub-contactors and the prime are conducted on a regular basis.

The prime establishes IMC sessions with each individual sub-contractor and/or global sessions including multiple sub-contractors.

The IMC system contacts all session members and enters them into the session.

Session members are challenged and their identity verified prior to being allowed access to the session.

The review team shares available information via audio, video, and shared workspaces where the interactive review of progress is conducted.

Points of interest from each site can be brought out and shared with all team members.

Specific issues can be resolved on-line in a review session or dealt with in separate sessions for each individual issue.

Automatic audio/video/data recordings that were created during the session and other event data are archived and can be replayed by the members and used as a contract performance-tracking vehicle.

Corporate Example—Global Sales Review:

The sales team of a multi-national corporation is having its weekly checkpoint call with its ten key sales persons. The sales admin triggers the sales call and the IMC system calls out to each person's Personal Number (PN). As team members answer, they are placed into audio conference.

One team member is in a foreign location and has re-chipped his PDA/cell phone to a local number to cut costs . . . the new number was entered into his/her PN and thus is transparent to setting up the call. The individual also connects to the session via WiFi, and a PDA browser.

Another team member misses the call but calls back the Directory Number of the missed call and is placed into the established session.

A third member takes the call on his/her cell, and also accesses the session on a hotel's business center PC browser.

One team member is unavailable and misses the call. All other participants access the session via PCs and soft phones on the PCs.

The Sales VP launches a shared workspace collaboration and displays the current sales forecast. The IMC system automatically detects the access device used by each member and sets the correct access mode for each.

The participants in Interactive Mode dynamically adjust their individual sales numbers. The participants in Monitor Mode see the changes and provide their input verbally. All session participants are seeing the changes to the sales forecast in real time. The IMC system manages the inputs so conflicts from simultaneous changes to the same workspace do not occur.

During the session the team jointly adjusts a new marketing poster.

When the sales session is terminated, an audio/video/data recording of the session is stored so that the individual who missed the session can retrieve the recording later and review the events that occurred during the session.

The invention claimed is:

1. An apparatus for identity managed collaboration comprising a memory for storing instructions and at least one processor for executing the instructions stored in memory, the instructions when executed by the processor configuring the apparatus to provide:

a connection control module for establishing communication with a plurality of access devices authorized to participate in a collaboration session between a plurality of participants each using at least one of the plurality of access devices;

a collaboration media module for providing a plurality of types of media included in the collaboration session available to one or more of the plurality of access devices;

an access control module for:

assigning a respective access mode to each of the plurality of participants in the collaboration session based on a security level assigned to the respective participant and a device used by the respective participant to access the collaboration session, the access mode identifying one or more of the plurality of types of media to provide to the respective participant to restrict access to types of media the respective participant is authorized to access in the collaboration session, the respective access modes assigned to the plurality of participants based on individual participant entitlement records associated with the plurality of participants, each of the entitlement records defining the security level assigned to the respective participant and the types of access devices that can be used by the participant to access the collaboration session; and providing access to at least one of the plurality of types of media from the collaboration media module to at least one of the access devices connected to the connection control module based on the respective access mode assigned to the each of the plurality of participants each associated with the respective access device wherein each of the plurality of participants will only have access to one or more of the plurality of types of media in the collaboration session based upon the respective assigned access mode; and an identity and session manager storing:

the plurality of participant entitlements each specifying;

which access modes the participant can use;

which participant identity security record is to be used to announce the participant's arrival in and departure from the collaboration session; and the participant's privilege to change access devices during the collaboration;

one or more collaboration session rules specifying characteristics of the collaboration session; and a plurality of participant identity security records, each one corresponding to one of the plurality of participants and specifying an identity to be used to identify the participant in the collaboration session.

2. The apparatus as claimed in claim 1, wherein the one or more collaboration session rules specify:

which of the plurality of communication media can be used in the collaboration session;

which of the plurality of participants can connect to the collaboration session; and which participants are to be contacted to connect to the collaboration session.

3. The apparatus as claimed in claim 2, wherein the identity and session manager are further for managing the plurality of participant entitlements, the one or more collaboration session rules.

4. The apparatus as claimed in claim 3, wherein the arrival and departure of each participant to and from the collaboration session is announced using the identity specified in the corresponding participant identity record specified for use in the corresponding participant entitlement record.

5. The apparatus as claimed in claim 1, further comprising an access rules module for the storage and management of access rules that specify which one of the plurality of access modes will be assigned to each participant responsive to an authenticated access device used by the participant to connect to the collaboration session.

6. The apparatus as claimed in claim 5, wherein the access control module assigns the respective access mode according to one or more access rules.

7. The apparatus as claimed in claim 1, wherein the access control module further for re-assigning an access mode when any of the participants switches from a first of the plurality of access devices to a second of the plurality of the access devices.

8. The apparatus as claimed in claim 4, wherein the connection control module establishes communication with a second access device associated with a participant before severing communication with the access device used by the participant.

9. The apparatus as claimed in claim 1, wherein the connection control module manages communication between the plurality of authenticated access devices and the connection control module.

10. The apparatus as claimed in claim 9, wherein the connection control module allows and disallows connections to the connection control module based on the collaboration session rules and the participant entitlement corresponding to each participant.

11. The apparatus as claimed in claim 10, wherein the connection control module initiates connections with participants responsive to the collaboration session rules when the collaboration session is initiated.

12. The apparatus as claimed in claim 1, wherein the connection control module accepts connections from participants responsive to the collaboration session rules and the corresponding participant entitlements.

13. The apparatus as claimed in claim 1, wherein the connection control module notifies the identity and session manager of the establishment and termination of a connection to each authenticated access device.

14. The apparatus as claimed in claim 1, wherein the connection control module provides collaboration continuity when a participant of the plurality of participants switches from a first access devices to a second access devices for connecting to the collaboration session wherein the access mode associated with participant is dynamically adjusted when the switch occurs.

15. The apparatus as claimed in claim 1, further comprising a session trigger module for initiating the collaboration session.

16. The apparatus as claimed in claim 1, wherein the collaboration media module provides one or more of:

an audio stream;
a video stream;
interactive file sharing;
instant messaging text areas; and
shared workspaces.

17. A method for identity managed collaboration comprising:

establishing communication with a plurality of access devices authorized to participate in a collaboration session between a plurality of participants each using at least one of the plurality of access devices;

providing a plurality of types of media used in the collaboration session to one or more of the plurality of access devices;

assigning a respective access mode to each participant, and associated one or more access devices, in the collaboration session based on a security level assigned to the respective participant and a device used by the respective participant to access the collaboration session, the access mode identifying one or more of the plurality of media types accessible to the respective participant to restrict access to types of media the respective participant is authorized to access in the collaboration session, the respective access mode assigned based on individual participant entitlement records associated with the plurality of participants, each of the entitlement records defining:

the security level assigned to a participant and the type of access device that can be used by the participant to access the collaboration session;

which access modes the participant can use;

which participant identity security record is to be used to announce the participant's arrival in and departure from the collaboration session; and the participant's privilege to change access devices during the collaboration; and providing access to at least one of the plurality of types of media from the collaboration media module to at least one of the access devices connected to the connection control module based on the respective access mode assigned to the participant associated with the respective access device, one or more collaboration session rules specifying characteristics of the collaboration session;

and a participant identity security record specifying an identity to be used to identify the participant in the collaboration session;

wherein each of the plurality of users will only have access to one or more of the plurality of types of media in the collaboration session based upon the respective assigned access mode.

18. A non-transitory computer readable memory containing the instructions for execution by a processor, the instructions for providing identity managed collaboration comprising:

establishing communication with a plurality of access devices authorized to participate in a collaboration session between a plurality of participants each using at least one of the plurality of access devices;

providing a plurality of types of media used in the collaboration session to one or more of the plurality of access devices;

assigning a respective access mode to each participant, and associated one or more access devices, in the collaboration session based on a security level assigned to the respective participant and a device used by the respective participant to access the collaboration session, the access mode identifying one or more of the plurality of media types accessible to the respective participant to restrict access to types of media the respective participant is authorized to access in the collaboration session, the respective access mode assigned based on individual participant entitlement records associated with the plurality of participants, each of the entitlement records defining:

the security level assigned to a participant and the type of access device that can be used by the participant to access the collaboration session;

which access modes the participant can use;

which participant identity security record is to be used to announce the participant's arrival in and departure from the collaboration session; and the participant's privilege to change access devices during the collaboration;

providing access to at least one of the plurality of types of media from the collaboration media module to at least one of the access devices connected to the connection control module based on the respective access mode assigned to the participant associated with the respective access device, one or more collaboration session rules specifying characteristics of the collaboration session;

and a participant identity security record specifying an identity to be used to identify the participant in the collaboration session;

wherein each of the plurality of users will only have access to one or more of the plurality of types of media in the collaboration session based upon the respective assigned access.

* * * * *